(12) United States Patent
König et al.

(10) Patent No.: US 7,100,374 B2
(45) Date of Patent: Sep. 5, 2006

(54) PISTON UNIT HAVING A CAPTIVE SPRING

(75) Inventors: Harald König, Ober-Mörlen (DE); Andreas Bischoff, Bad Vilbel (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 53 days.

(21) Appl. No.: 10/506,824

(22) PCT Filed: Mar. 15, 2003

(86) PCT No.: PCT/EP03/02723

§ 371 (c)(1), (2), (4) Date: Sep. 7, 2004

(87) PCT Pub. No.: WO03/078223

PCT Pub. Date: Sep. 25, 2003

(65) Prior Publication Data

US 2005/0198954 A1    Sep. 15, 2005

(30) Foreign Application Priority Data

Mar. 20, 2002 (DE) ................. 102 12 539

(51) Int. Cl.
*F01B 31/00* (2006.01)
*B60T 11/20* (2006.01)
(52) U.S. Cl. .......................................... 60/562; 92/131
(58) Field of Classification Search .................. 60/562; 92/131, 135, 255
See application file for complete search history.

(56) References Cited

U.S. PATENT DOCUMENTS

| | | | | |
|---|---|---|---|---|
| 3,522,706 A | | 8/1970 | Bueler | |
| 3,555,822 A | * | 1/1971 | Rivetti | 60/562 |
| 3,701,257 A | * | 10/1972 | Gaiser | 60/562 |
| 5,732,557 A | * | 3/1998 | Sacristan | 60/562 |
| 5,878,575 A | * | 3/1999 | Kreh et al. | 60/562 |
| 6,012,288 A | * | 1/2000 | Gualdoni et al. | 60/562 |
| 6,425,313 B1 | * | 7/2002 | Kleinedler et al. | 92/131 |

FOREIGN PATENT DOCUMENTS

| | | |
|---|---|---|
| DE | 28 49 045 A1 | 5/1980 |
| DE | 33 12 192 A1 | 10/1984 |
| DE | 195 20 679 A1 | 6/1996 |

(Continued)

OTHER PUBLICATIONS

International Search Report of Application No. PCT/EP03/02723 dated Jun. 17, 2003.

(Continued)

*Primary Examiner*—Edward K. Look
*Assistant Examiner*—Michael Leslie
(74) *Attorney, Agent, or Firm*—RatnerPrestia

(57) ABSTRACT

The invention relates to a piston unit having a captive spring for a cylinder, particularly for a tandem master cylinder of a motor vehicle, wherein the spring, with a first end, is supported at least indirectly on a piston and, with a second end, is supported on a retaining device that can be displaced relative to the piston, and the movement of the retaining device relative to the piston is limited by securing means.

The invention is characterized in that the securing means have a projection, which is mounted in a non-detachable manner on the piston and whose free end is provided with a stop that limits the movement of the retaining device relative to the piston.

8 Claims, 1 Drawing Sheet

FOREIGN PATENT DOCUMENTS

| | | |
|---|---|---|
| DE | 196 06 220 A1 | 8/1997 |
| GB | 2 017 240 A | 10/1979 |
| GB | 2 051 988 A | 1/1981 |
| GB | 2 144 803 A | 3/1985 |

OTHER PUBLICATIONS

German Search Report of Application No. 102 12 539.2 dated Jul. 3, 2003.

* cited by examiner

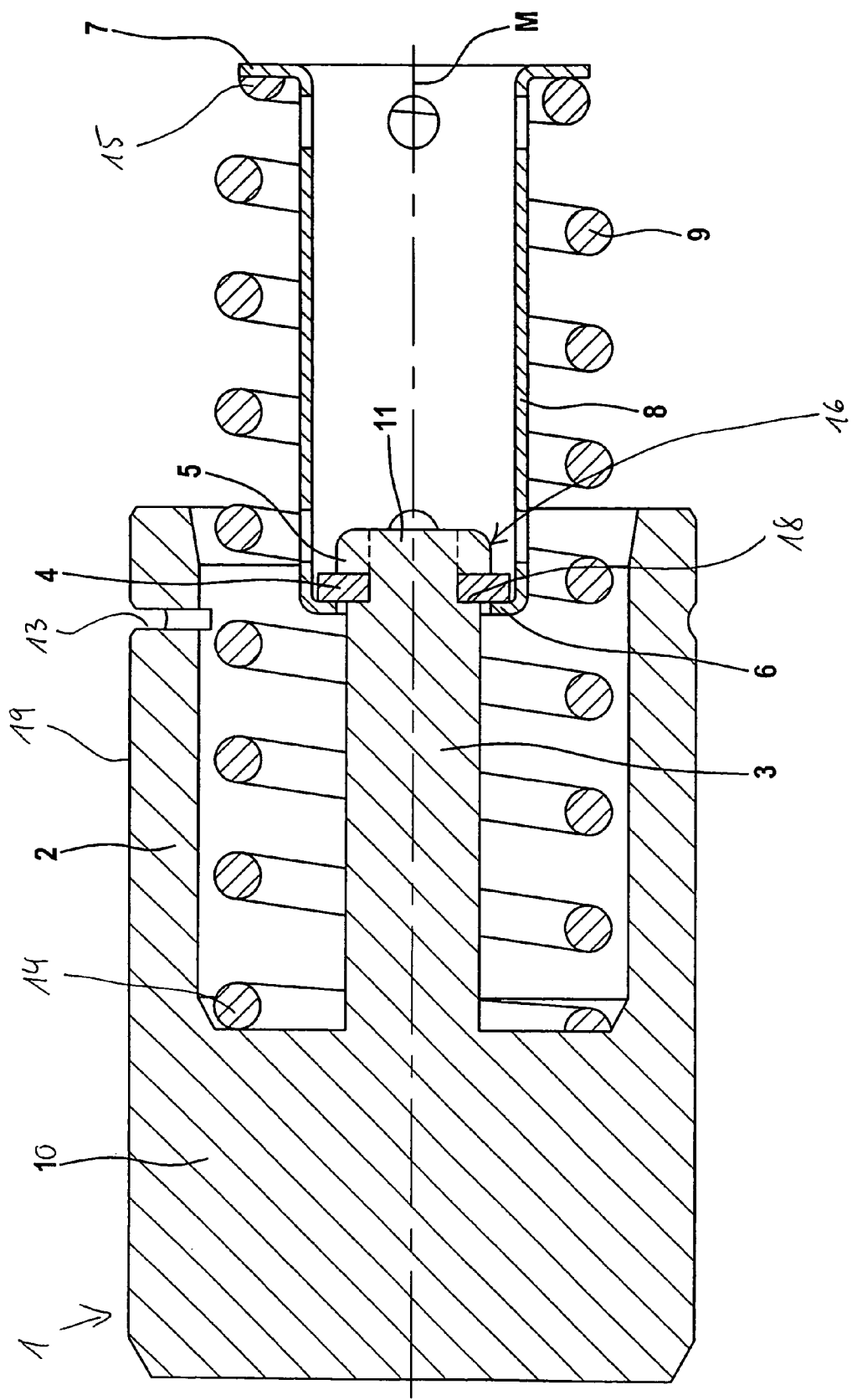

PISTON UNIT HAVING A CAPTIVE SPRING

TECHNICAL FIELD

The present invention relates to a piston unit having a captive spring for a cylinder, in particular a tandem master cylinder of a motor vehicle, wherein the spring, with a first end, is supported at least indirectly on a piston and, with a second end, is supported on a retaining device that is displaceable relative to the piston and the movement of which relative to the piston is limited by securing means.

BACKGROUND OF THE INVENTION

A piston unit of this type is e.g. shown in DE 33 12 192 A1 describing a master cylinder for a brake system of a motor vehicle. The master cylinder explained in the publication is a cylinder having two pistons arranged one behind the other, by which two separate brake systems are actuated by means of brake pressure.

It is necessary in a master cylinder (tandem master cylinder) provided with two pistons that the two pistons shut off, if possible simultaneously, two pressure chambers limited by the pistons in order that pressure will simultaneously develop in the two brake circuits. This necessitates that the two pistons have a defined distance from each other in an initial position. Said distance is defined by a captivated spring of the piston (primary piston) actuated on the inlet side. The spring of the primary piston is relatively stiff compared to a spring returning the second piston (secondary piston) so that the second spring will yield at the commencement of the movement of the two pistons and, thus, the two pistons at a predetermined distance will simultaneously close the openings that lead to a reservoir. In order to adjust the length of the first spring at the primary piston, which is defined by the position of the captivation, the above-mentioned patent application arranges for a screw having a screw head, which forms a stop for a sleeve that is movable with respect to the screw. Said sleeve, with a free end, supports a free end of the stiff spring. Another end of the spring bears against the primary piston. Readjustment of the screw renders it possible in the prior art piston unit to adjust the length of the spring. It is, however, disadvantageous, in the piston unit known from the art that both the screw and the piston must have a thread and that the screw can twist in relation to the piston.

BRIEF SUMMARY OF THE INVENTION

An object of the invention is to simplify the design of the piston unit and additionally improve the reliability of the mode of operation of the piston unit.

This object is achieved in that the securing means include a projection that is non-detachably arranged at the piston and whose free end is provided with a stop that limits the movement of the retaining device relative to the piston. Consequently, the invention principally resides in a non-detachable arrangement of a projection at the piston. This arrangement reliably prevents a change in position of the piston.

According to the invention, the projection at the piston can be provided by means of a metal forming process, and it can be welded, cemented, wedged by frictional engagement, or riveted to the piston. Thus, the invention covers all coupling techniques connecting the projection to the piston in a simple and non-detachable manner.

The invention can also be implemented in a master cylinder having only one single piston. Likewise, it is not absolutely necessary that the cylinder is used for a brake system.

A solution being especially favorable for manufacturing the projection is achieved in that the projection is formed integrally with the piston, preferably by extrusion. The projection of the invention is hence shaped out of the material of the piston, with the result that an additional operation for coupling the projection with the piston is deleted. To this end, an appropriate workpiece is inserted into an appropriately configured mold, and the piston including the projection is shaped by means of a die. As this occurs, the material for producing the projection flows into a corresponding opening of the die.

However, the projection can also be formed by way of turning the piston material.

As has been explained hereinabove, it is necessary to provide a stop that defines the maximum expansion of the spring in its longitudinal direction. To this end, the position of the stop must be fixed very precisely so that the tandem master cylinder operates properly. Thus, it is preferred that the stop is fastened to the piston in a form-fit.

To be able to keep very close tolerances, the projection is preferably cylindrical and includes a step for abutment of a disc at least in the area of the free end.

In a favorable improvement of the invention, the annular disc riveted to the projection forms the stop. The step defines the position of the disc in this arrangement. The annular disc can be mounted on the step, and a shoulder of the projection extends through an opening in the annular disc and can be deformed by a suitable metal forming operation, preferably by wobble-riveting, thereby connecting the disc with the projection in a non-detachable manner. It is, however, also possible within the limits of the invention to connect the disc to the projection in a non-detachable manner by way of welding or riveting.

Preferably, the stop can be formed by way of enlarging the end portion of the projection by upsetting. A reduction of the components of the piston-and-cylinder unit is achieved thereby.

In a favorable improvement of the invention, the piston has a bottom and a bowl projecting from it that accommodates the spring and the projection at least in part. There is a free space between an outside wall of the die and an inside wall of the mold, into which material flows, to arrange a mold shaped like this. Aluminum has proved to be a suitable material for the piston. However, other deformable materials such as steel, brass, or plastics can also be used. This design of the piston allows reducing the mounting space.

The assembly of the piston in the cylinder is simplified because the piston is shaped in an extrusion process and includes on one outside surface recesses used to accommodate a push rod that moves the piston.

BRIEF DESCRIPTION OF THE DRAWING

FIG. 1 is a cross-sectional view of a piston of a piston unit of the present invention.

DETAILED DESCRIPTION OF THE PREFERRED EMBODIMENT

The drawing shows a cross-sectional view of piston 1. Piston 1 includes a bottom 10 and a bowl 2 projecting from the bottom. A cylindrical projection 3 extends in bowl 2 along a center line M of piston 1. Projection 3 and bowl 2 are extruded from the material of piston 1.

Step 18 is shaped at a free end 16 of projection 3 and used as an abutment for a stop 4 configured as an annular disc. A shoulder 11 of projection 3, shown in dotted lines, projects through an opening in the annular disc 4 and can be shaped to become a rivet head 5 e.g. by means of wobble-riveting, with the result that disc 4 is non-detachably connected to projection 3.

Shoulder 11 and step 18 can be produced by means of turning of the projection 3. Step 18 allows very precisely defining the position of disc 4 and maintaining narrow tolerances.

A flange 6 of a retaining device 8, pointing radially inwards and being configured as a sleeve, makes catch at a side of disc 4 facing piston 1. At a free end, sleeve 8 includes a circumferential flange 7 pointing in a radially outward direction. A spring 9 is supported with a first end 14 on the bottom 10 of piston 1 and with a second end 15 on the flange 7 of sleeve 8 and is thus biased. The maximum expansion of spring 9 in the longitudinal direction is defined by sleeve 8. Disc 4 limits the movement of sleeve 8 with respect to piston 1.

It is possible to fix the position of disc 4 by means of upsetting the free end 16 of projection 3. Finally, it is possible under certain circumstances to manage without disc 4 by way of forming a stop 4 for sleeve 8 by upsetting the free end 16, with the projection 3 being upset until stop 4 has adopted the proper position.

Recesses 13 used to accommodate a push rod that moves piston 1 are provided on an outside surface 19 of piston 1.

The invention claimed is:

1. Piston unit having a captive spring for a cylinder wherein the spring, with a first end, is supported at least indirectly on a piston and, with a second end, is supported on a retaining device that is displaceable relative to the piston and the movement of which relative to the piston is limited by securing means, wherein the securing means include a projection that is non-detachably arranged at the piston and whose free end is provided with a stop that limits the movement of the retaining device relative to the piston, said stop comprising a disc riveted to the projection.

2. Piston unit as claimed in claim 1, wherein the projection is formed integrally with the piston by way of extrusion.

3. Piston unit as claimed in claim 2, wherein the disc is fastened to the piston in a form-fit.

4. Piston unit as claimed in claim 3, wherein the projection is cylindrical and includes a step for abutment of the disc at least in the area of the free end.

5. Piston unit as claimed in claim 4, wherein the disc is fastened to the piston by way of wobble-riveting.

6. Piston unit as claimed in claim 1, wherein the stop is provided by deforming the free end of the projection.

7. Piston unit as claimed in claim 5, wherein the piston includes a bottom and a bowl projecting from it, said bowl accomadating the spring and the projection at least in part.

8. Piston unit as claimed in claim 5, wherein the piston is formed in an extrusion process and, on an outside surface, includes recesses used to accommodate a push rod that moves the piston.

* * * * *